(12) United States Patent
Sandig

(10) Patent No.: US 6,334,369 B1
(45) Date of Patent: *Jan. 1, 2002

(54) TOOTHED WHEEL UNIT WITH EXTERNAL TOOTHING

(75) Inventor: Hans-Georg Sandig, Sonthofen (DE)

(73) Assignee: BHS Cincinnati Getriebetechnik GmbH, Sonthofen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/258,107

(22) Filed: Feb. 25, 1999

(30) Foreign Application Priority Data

Feb. 27, 1998 (DE) .......................................... 198 08 519

(51) Int. Cl.$^7$ ................................................ F16H 1/06
(52) U.S. Cl. .............................. 74/413; 74/431; 74/434
(58) Field of Search .............................. 74/413, 412 R, 74/431, 432, 434

(56) References Cited

U.S. PATENT DOCUMENTS

| 2,414,134 A | * | 1/1947 | Bartlett ........................ 74/413 |
| 3,133,451 A | * | 5/1964 | Thomas ........................ 74/413 |
| 4,615,310 A |   | 10/1986 | Umeha et al. |

FOREIGN PATENT DOCUMENTS

| DE | 250 935 | 4/1910 |
| DE | 300880 | 12/1913 |
| DE | 317058 | 12/1919 |
| DE | 350422 | 3/1922 |
| DE | 499 901 | 6/1930 |
| DE | 1985822 | 5/1968 |
| DE | 2024436 | 12/1971 |
| DE | 219254 | 2/1985 |
| FR | 529 300 | 11/1921 |

OTHER PUBLICATIONS

Brochure of BHS Voith, "Parallel Shaft Gear Units for GE gas turbines," No. D–2400–907 e, 1/5–93.

Brochure of BHS Voith, "Parallel Shaft Gear Units single-stage Type TG," No. Dj–2400–905 e, 1/8–94 SV.

Brochure of BHS Voith, "BHS–Voith Parallel Shaft Gear Units, single stage for high speed installations," No. P2100 e, h–2/5–93.

Brochure of American Petroleum Institute, "Special Purpose Gear Units for Petroleum, Chemical, and Gas Industry Services," API Standard 613, Fourth Edition, Jun., 1995.

Brochure of BHS Werk Sonthofen, "BHS–Stoeckicht Epicyclic Gear Units," h–5/6–88.

Brochure BHS P2600 d 3 95 WA.

Brochure BHS–Cincinnati P2500 d 2/9–96.

* cited by examiner

*Primary Examiner*—David Fenstermacher
(74) *Attorney, Agent, or Firm*—Baker Botts L.L.P.

(57) ABSTRACT

The invention relates to a toothed wheel unit (12) with external toothing, preferably for heavy machinery gears and/or rapidly moving gears like turbomachinery gears, comprising a toothing carrier (22) with an external toothing (20*a*,20*b*) provided on a circumferential surface and a bearing journal (32*a*,32*b*) or connection portion in at least one axial end region (24*a*,24*b*) of the toothing carrier (22), joined with the toothing carrier. The toothing carrier (22) is either provided with a toothing carrier casing (22) whose inner diameter (d1) is larger than the diameter (d2) of the bearing journal (32*a*,32*b*) or the connection portion or/and with a plurality of toothing carrier plates (248*a*,248*b*) following each other in axial direction and joined with each other.

65 Claims, 8 Drawing Sheets

TOOTHED WHEEL UNIT WITH EXTERNAL TOOTHING

BACKGROUND OF THE INVENTION

The invention relates to a toothed wheel unit with external toothing, preferably for heavy machinery gears and/or rapidly moving gears like turbomachinery gears, comprising a toothing carrier with an external toothing provided on a circumferential surface and a bearing journal or connection portion in at least one axial end region of the toothing carrier, joined with the toothing carrier.

Toothed wheel units of this type of interest are e. g. used in spur gears, as shown in BHS catalogue "BHS-Stirnradgetriebe, einstufig, für hochtourige Anlagen" (BHS spur gears, single stage, for high-speed installations) with masthead H-3/1-87.

In such gears, preferably the large spur toothed wheels have dimensions with diameters from e.g. 500 mm up to 1250 mm. Simultaneously the axial width of the large toothed wheels can be in the range of 200 to 600 mm in the case of spur toothing and single helical toothing, and in the range of 250 to 700 mm in the case of double helical toothing.

It is known to produce such toothed wheel units in full shaft construction. Full shaft construction means that a plate body is produced integrally with a shaft, the shaft projecting over the end surfaces of the plate body and serving for bearing. This full shaft construction has advantages. The stress due to the centrifugal force and the difference in heat between the toothing region and the central region is small. Furthermore, due to the massive construction, small variations in shape (constant volume) result e.g. in the case of stress by centrifugal forces.

However, the full shaft construction also presents some disadvantages. In order to illustrate these disadvantages, the way of producing such toothed wheel units in full shaft construction has to be outlined in brief. At first, a cast steel part is produced, which comprises the shaft and the plate body in integral construction. This case steel part is then forged and after that subjected to a metal cutting treatment, in order to define the final dimensions and preferably to provide the toothing. To reduce the casting and forging stresses and to optimize the texture of the material, various heat treatments are executed in between. Subsequently, carbonization is performed at approx. 900° C. and after that it is hardened (case hardening).

The thus produced hardening strains can amount to considerable values, especially in case of larger parts, and cause problems.

Further problems are to a considerable degree due to the process of casting, in which a so-called segregation zone forms in the central region of the shaft and the plate body, in which impurities of the steel alloy and perturbations of the texture structure are present in high concentrations.

When the finished toothed wheel unit is finally commissioned, additional centrifugal force stresses and operation heat stresses occur, especially during rapid starting operation. These stresses can lead to uncontrollable stress conditions in the segregation zone.

In order to eliminate the negative effects of the segregation zone, which are the larger, the larger the volume of the entire toothed wheel unit is, it has already been thought of going over to a hollow shaft structure, preferably by reboring the segregation zone so that the aggregation of bad material in the interior of the shaft is removed. However, this reboring of the shaft has not allowed to solve all the problems. On the one hand, the stresses occurring due to the centrifugal force and the temperature differences are increased with respect to the full shaft structure so that the material can give way, when centrifugal forces occur in the region of the inner diameter, and thus, additional possibilities for the deformation of the plate body occur. On the other hand, the concentration of impurities and perturbations of the texture structure known as segregation persists in the regions adjacent to the bore. Furthermore, hardening strains cannot be excluded, because the hardening process is insufficient in the region of the bore.

Toothed wheel units have also been considered in which the plate body is shrunk on the shaft. The application of this structure is limited, because a disengagement of the plate body from its connection with the shaft body cannot safely be avoided due to high centrifugal force and heat loads. The tendency, therefore, still goes to an integral structure.

SUMMARY OF THE INVENTION

It is an object of the invention to construct a toothed wheel unit of the generic type in such a way that strain conditions, which are difficult to control, especially hardening strain conditions, are avoided or minimized.

To achieve the object it is proposed according to the invention that the toothing carrier is either provided with a toothing carrier casing, whose inner diameter is larger than the diameter of the bearing journal or the connection portion, or/and with a plurality of toothing carrier plates following each other in axial direction and joined with each other.

With the construction according to the invention, segregation zones can be avoided to a large extent or completely, as the concentration of material over a large volume hardly accessible to heat treatments from the outside is avoided. With the construction according to the invention, all volume regions of the components, i.e. the toothing carrier casing, the bearing journals, the connection portions and the toothing carrier plates, are relatively thin-walled so that, on the one hand, in contrast to large volume work pieces, they do not present comparable problems caused by the segregation zone and, on the other hand, external treatments act more homogeneously onto all volume regions.

It may happen that with the toothed wheel units according to the invention, individual components or regions of components are exposed to higher stresses than with the known toothed wheel units of the full shaft construction and the hollow shaft construction. However, it has turned out that the occurring stress distributions are easier to calculate, in particular because elements like tubular body plates lead to two-dimensional, possibly even linear stress conditions and cubically oriented radial stress profiles are avoided.

In the case of a tubular toothing carrier casing, the stress problem reduces to the problem of a thin-walled tube, a wall thickness of 150 to 200 mm being possible, when the toothing diameter is 900 mm and more. In case of smaller toothing diameters, the wall thickness is reduced correspondingly to the ratio of the toothing diameters. This thin-walled tube is shorter than the length of the shaft in case of a full shaft construction. Due to the thinness of the wall, an almost uniform heat treatment of all volume regions can be expected on case hardening. Forging is also rendered easier and more favourable in view of the avoidance of stress conditions, inasmuch as the toothing carrier casing can be rolled in a ring-roll mill.

In case of the second alternative of the proposition according to the invention (toothing carrier plates), similarly favourable conditions result in view of the forging and the hardening in case of a corresponding dimensioning of the respective plate thickness.

At first, the possibilities of development of the first alternative (toothing carrier casing) will now be treated. The toothing carrier casing can be joined at at least one end, preferably at both ends, to a end plate, in the central region of which the bearing journal or the connection portion is arranged. If end plates with one respective bearing journal or other connection portion are mounted on both ends, the same possibilites as to the bearing of the toothed wheel unit result as with the known full shaft constructions or hollow shaft constructions. Compared to the size of the entire toothed wheel unit, the end plates with bearing journals or other connection portions have a relatively small volume so that the problems on casting, forging and hardening and during operation due to centrifugal force and temperature stresses can be avoided.

Besides the two-plates-solution, one embodiment with only one end plate will nevertheless be discussed, because the creation of a cantilevered toothed wheel unit should not be excluded. Furthermore, it is not to be excluded that a toothing carrier casing is produced with an end plate on one end and is joined to an end plate on the other open end. With such a solution, the problems of casting, forging and hardening and during operation due to centrifugal force and heat stresses are also reduced to a large extent.

The end plate can be produced integrally with the bearing journal or other connection portion. Due to the geometry of a component consisting of an end plate and a bearing journal, easier conditions for casting, forging and hardening result.

The end plate—viewed in a sectional plane containing the axis of the toothed wheel unit—has walls which extend deviating from a plane normal to the axis in the radial intermediate region between the outer diameter of the bearing journal or connection portion and the inner diameter of the toothing carrier casing. This measure is in particular taken in view of the neutralization of centrifugal forces. If a toothing carrier casing, i. e. a hollow tube, is provided according to the invention, it is naturally more sensitive to centrifugal forces occurring in rapid movement operation than a toothed wheel unit of the full shaft construction. On the other hand, end plates, which are closed in their center or which extend radially inward to a smaller diameter corresponding to the diameter of the bearing journal, are naturally less sensitive to centrifugal forces, i. e. they are less subjected to a radial increase of diameter under the influence of centrifugal forces. This could lead to stresses in the connection zone between the end plate and the toothing carrier casing. One possibility to find a remedy is to provide for an elastic behaviour of the end plate under the influence of a centrifugal force. Such an elastic behaviour can be obtained by shaping the end plate such that as—viewed in a sectional plane containing the axis of the toothed wheel unit—the wall shape and the mass distribution of the end plate are such that radial displacements of the connection region on the end plate side and of the connection region on the toothing carrier side due to centrifugal forces are approximated to one another irrespective of the connection of the two connection regions.

A development is possible in which—viewed in a sectional plane containing the axis of the toothed wheel unit—the wall shape of the end plate has a convex curvature towards the inside of the toothing carrier casing in the radial region between the outer diameter of the bearing journal or connection portion on the one hand and the toothing carrier casing, on the other hand.

Another possibility to limit stresses in the connection region between the end plate and the toothing carrier casing caused by centrifugal forces is to provide the end plate with a compensation mass which radially exceeds the zone of connection with the toothing carrier casing. Due to the compensation mass, the end plate, in spite of its material extending further radially inward compared with the toothing carrier casing, suffers a similar or equal expansion under the influence of radial forces as the toothing carrier casing.

Several possibilities exist to join the end plate with the toothing carrier casing; according to claim 8, it is possible that the end plate is welded to the toothing carrier casing at the zone of connection; it is furthermore possible that the end plate is in a torque transmitting or/and centering form-fit connection or in a force transmitting connection with the toothing carrier casing at the zone of connection, a serration being possible as an interesting version of a torque transmitting and centering form-fit connection.

The axial connection, which possibly also serves for centering, can be obtained in such a manner that the end plate is axially tensioned towards the toothing carrier casing at the zone of connection, axial tensioning means being provided in the radial region of the zone of connection or radially inside the zone of connection, preferably in the axis region of the toothed wheel unit for the axial tensioning of the end plate with respect to the toothing carrier casing.

Besides the already mentioned serration, other centering means can be provided between the end plate and the toothing carrier casing With all kinds of connection between the end plate and the toothing carrier casing, attention has to be paid that the connection itself does not lead to the development of new harmful stresses.

In general, case-hardened steel can be used for the end plates and the bearing journals joined to them, if desired. However, it is also possible to use tempering steel for the end plates, because the demands on the tooth engagement behaviour of the toothed ring, which require the use of case-hardened steel for the toothing carrier casing, do in general not exist for the end plates and the bearing journals.

In principle it is also possible to produce the proposed toothing carrier casing of highly quenched and subsequently drawn tempering or nitriding steel. Also in this case, this structure yields a higher precision of the stresses.

Like in the prior art according to the above-cited BHS-publication with the masthead H-3/1-87, it is possible according to claim 15 that at least one of two bearing journals or connection portions is made hollow and that a shaft associated to the toothed wheel unit is guided through the hollow bearing journal or connection portion and is in torque transmitting connection with the toothed wheel unit inside the toothing carrier casing or in the region of an opposing bearing journal or connection portion. In this way, a possibility to influence the stiffness against torsion of the gear train by an extension of the associated shaft is provided also in the toothed wheel unit according to the invention. The BHS-publication H-3/1-87 allows to clearly recognize the difference with respect to the basic idea of the present invention also inasmuch as on page 11 of the publication a hollow shaft structure is shown, in which the bearing journals are produced integrally with the plate body so that the problems of casting, forging and hardening persist in spite of the reboring, whereas in addition the operative stresses due to centrifugal force and heat stresses are considerably higher, especially in the region of the bore.

The proposition according to the invention can be applied independent of the arrangement of the external toothing; the toothing can e.g. be arranged in form of a spur toothing, a helical toothing and a double helical toothing.

The thin-walled structure of the toothed wheel unit according to the invention allows to provide cooling surfaces in the toothing carrier close to the external toothing, said cooling surfaces being used for heat exchange contact with a coolant and/or for conducting said coolant. This is important, as especially in rapidly moving toothed wheel units, large heat production occurs in the region of engagement with the counter-toothing, which can lead to heat gradients inside the toothed wheel unit. If one manages to dissipate this heat, the course of the gradient becomes flatter. This means lower resulting heat stresses and in particular a considerably more stable behaviour of the toothing contact pattern. The latter leads to a more uniform load of the teeth and thus either to a higher loading capacity or to a higher tooth security.

The possibility exists in the embodiment with a toothing carrier casing that said cooling surfaces used for heat exchange contact and/or for conducting said coolant comprise a cooling casing, which is arranged radially inside the toothing carrier casing. Various coolant flow patterns can be produced adapted to the heat production profile. It is e.g. possible that the coolant conducting cooling surfaces cause a coolant flow, which is essentially parallel to the axis direction of the toothed wheel unit; according to claim 20, it is furthermore possible that the coolant conducting cooling surfaces cause a coolant flow with a helical course around the axis of the toothed wheel unit; it is furthermore possible that the coolant conducting cooling surfaces cause a coolant flow, which passes at least once continuously all over the axial length of the external toothing.

Furthermore, various combinations of inflow and discharge are possible, again adapted to the heat production profile. It is e.g. possible that the coolant conducting cooling surfaces cause a coolant flow, which passes from both axial ends of the external toothing to an axial center region of the external toothing; it is furthermore possible that the coolant conducting cooling surfaces cause a coolant flow, which passes from an axial center region of the external toothing to both axial ends of the external toothing; it is furthermore possible that the coolant flow is guided through the toothing carrier casing towards the surrounding region of the external toothing in the axially central region of the external toothing, preferably in the region of an axially central interruption of the external toothing.

A simple possibility to guide the coolant consists in the fact that the cooling casing is provided with spacer or/and coolant conducting ribs on its outer surface directed towards the inner circumferential surface of the toothing carrier casing. However, it is additionally and/or alternatively possible that ribs are arranged at the inside of the toothing carrier casing. For reasons of production, the latter possibility is, however, less preferred.

Depending on the respective desired coolant flow patterns, it is possible that the ribs extend essentially parallel to the axis of the toothed wheel unit, or it is possible that the ribs extend helically around the axis of the toothed wheel unit.

It is possible and advantageous, but not necessary, that the toothing carrier casing is formed by at least one single-piece tube section. The desired effect of the invention is obtained to a high degree, if in case of tube sections having external diameters (toothing diameters) of 900 mm and more the radial thickness of the tube section is less than 200 mm, preferably less than 150 mm, the radial thickness being reduceable in case of tube sections having external diameters (toothing diameters) of less than 900 mm, the ratio of reduction corresponding to the ratio of the respective external diameter:900 mm. In other words, it is advantageous according to the invention, if according to claim 30, the radial thickness of the tube section is less than 30% of the tube section external diameter (toothing diameter), preferably less than 20%.

Furthermore, the geometrical relations can also be represented in such a way that, the radial thickness of the tube section less the toothing height is more than four times the real pitch module of the toothing, preferably more than eight times the real pitch module of the toothing. The wall thickness instructions for the toothing carrier casing given above also are chosen such that the connections with end plates can be made without the occurrence of additional dangerous stresses.

In what follows, the second alternative of the invention will be discussed, which aims at an axial subdivision of the toothing carrier.

Two or more toothing carrier plates can follow one another, the axial thickness of the toothing carrier plates being less than 200 mm, preferably less than 150 mm. Particularly appropriate possibilities for the access of heat treatment and other treatments to the total volume of the toothing carrier are obtained, if the toothing carrier casing is formed by toothing carrier ring plates following each other in the axial direction and indirectly or directly joined to one another.

A subdivision into axial sections is possible, even if a continuous toothing over several plates is to be provided. In this case, however, one has to pay attention to a particularly exact mutual centering of the plates by centering means, like e.g. serrations, in order to avoid considerably increased tooth wear at the contact zones in the toothing region.

The subdivision into axially adjacent plates is particularly advantageous, if the external toothing itself is subdivided in axial direction one or more times for reasons of toothing characteristics, as e.g. in the case of double helical toothings. One will then make the subdivision of the plates coincide with the axial subdivision of the external toothing length.

The second alternative of the invention (toothing carrier plates axially following one another) can also be realized in such a way that the toothed wheel unit comprises a shaft with a radial flange and that a respective toothing carrier ring plate is mounted on each side of the radial flange. With such a structure, too, relatively uniform and short distances result for the action of a treatment onto the total volume of the parts forming the toothed wheel unit. It is possible that the toothing carrier ring plates are connected with the radial flange by a respective torque transmitting or/and centering form-fit connection and axial tensioning means.

On ring-shaped moulding of toothing carrier plates axially following one another, the dimensional values according to claim 38 are preferably kept to in such a way that the radial thickness of the toothing carrier ring plates and the axial thickness of the toothing carrier ring plates are less than 300 mm, preferably less than 200 mm.

The moulding of the toothed wheel unit according to the invention allows to mount temperature sensor elements, preferably thermoelements, next to the toothing, preferably at the inner circumferential surface of the toothing carrier casing. This is not only advantageous as it allows to indicate dangerous conditions. Instead, it is also possible, e.g. if cooling by means of a coolant is provided, to control the coolant throughput depending on the measured temperatures.

The arrangement according to the invention can be developed in such a way that the toothed wheel unit comprises at least one annular pressure comb and/or one pressure comb engagement ring, preferably as a part of an end plate or a compensation mass mounted to an end plate.

DESCRIPTION OF THE DRAWINGS

The annexed figures illustrate the invention with reference to particular embodiments.

DESCRIPTION OF THE EMBODIMENTS

Figure 1:
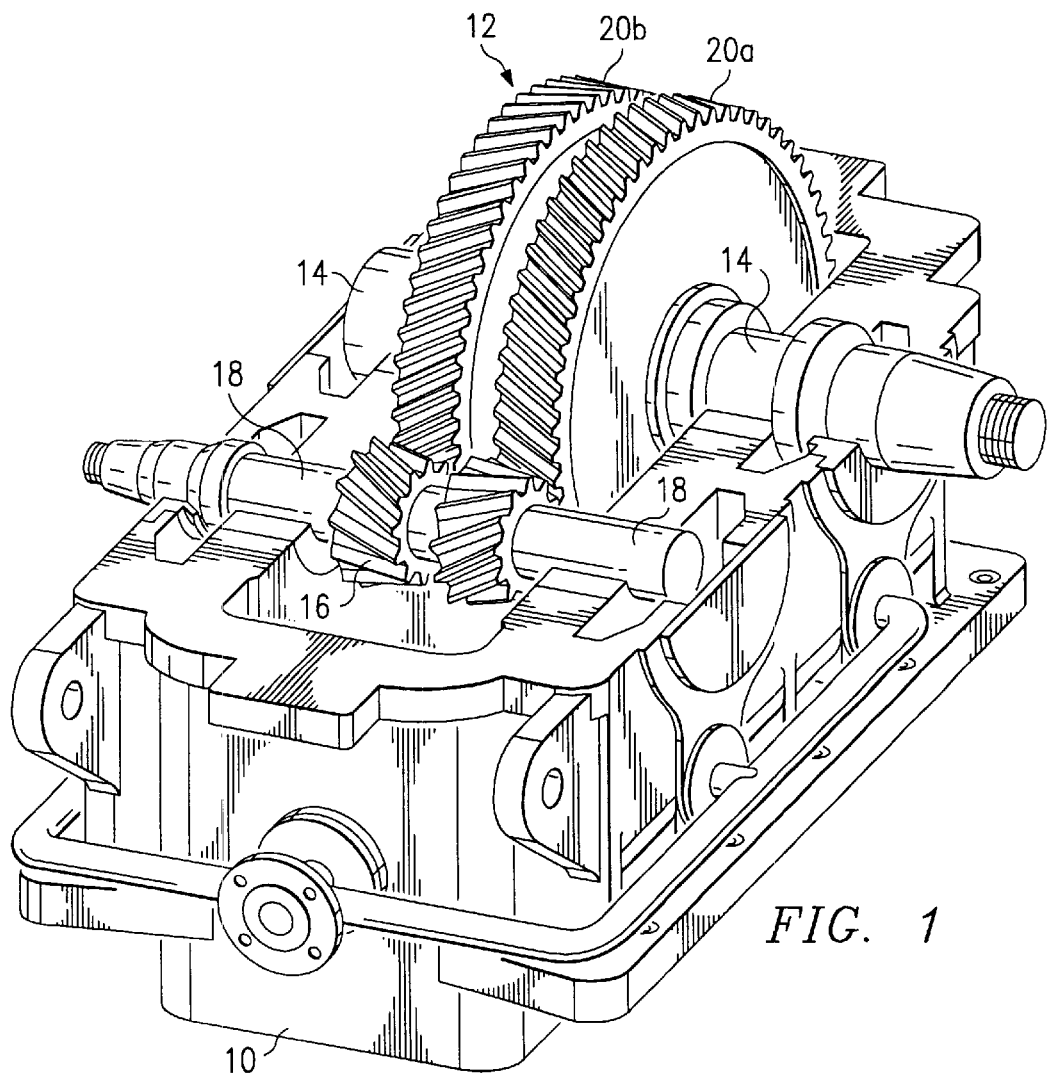
FIG. 1 shows a partial view of a spur gear with spur wheels to be moulded according to the invention.

According to FIG. 1, a large spur wheel 12 runs on bearing journals 14 in a gear box 10, whose lower part is shown. This large spur wheel 12 meshes with a small spur wheel 16, which also runs on bearing journals 18 in the gear box. One can see that both spur wheels 12 and 16 are formed as so-called double helical toothing spur wheels, in order to obtain a mutual axial localization. Correspondingly two spur toothings 20a and 20b can be recognized on the large spur wheel 12.

Figure 2:
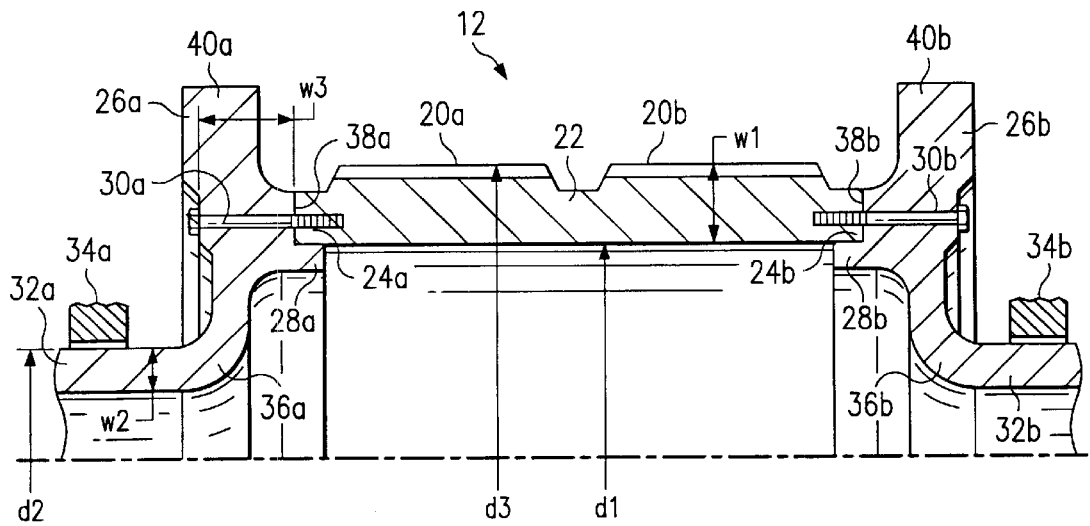
FIG. 2 shows a first embodiment of a toothed wheel unit moulded according to the invention in a longitudinal section containing the axis.

The toothed wheel unit 12 shown in FIG. 2 corresponds e.g. to the large spur wheel 12 of FIG. 1. This spur wheel unit 12 consists of a toothing carrier casing 22, onto which the two helical toothings 20a and 20b according to FIG. 1 are arranged. Each end 24a and 24b of the toothing carrier casing 22 is connected with an end plate 26a and 26b, respectively. They are centered with respect to the end plates by centering shoulders 28a and 28b and tightened in axial direction by screw bolts 30a and 30b, respectively. On the end plates 26a and 26b bearing journals 32a and 32b, respectively, are moulded, which run in bearings 34a and 34b, respectively.

The toothing carrier casing 22 is produced in the way described in the introduction by casting, forging, machining and intervening heat treatments and case-hardening, whereas the end plates 26a, 26b with the bearing journals 32a, 32b can be made of tempering steel. The end plates 26a, 26b merge into the bearing journals 32a,32b via radiused connecting curves 36a, 36b, which leads to a radial elasticity of the end plates 26a, 26b so that the end plates 26a, 26b can follow possible increases of the diameter of the toothing carrier casing 22 due to centrifugal forces by an elastic deformation of the radiused connecting curves 36a, 36b and the radial stresses can be kept low in the connection zones 38a, 38b. Furthermore, the end plates 26a, 26b are equipped with integral ring extensions 40a, 40b, which are dimensioned in such a way as to provide for equality or approximate equality during rotation between radial increase due to centrifugal forces at the end plates 26a, 26b, on the one hand, and at the toothing carrier casing 22, on the other hand.

Attention is drawn to the fact that the inner diameter d1 of the toothing carrier casing 22 is considerably larger than the diameter d2 of the bearing journals 32a, 32b. This diameter difference between d1 and d2 is to a considerable degree co-responsible for the thinness of the walls w1, w2, w3 in all regions of the toothed wheel unit 12. By comparison of FIG. 2 with page 11, upper figure of the publication BHS-H-3/1-87 already mentioned several times before, one recognizes an essential difference in that according to FIG. 2, the inner diameter d1 is considerably larger than the diameter d2. This difference is responsible for the provision of the uniformly small wall thicknesses w1 to w3. As the comparison further shows, the reboring of a full shaft construction applied according to the upper figure on page 11 of the BHS-publication H-3/1-87 would never lead to the favourable wall thickness conditions of FIG. 2. With an outer tube section diameter d3 of 900 mm, the wall thickness w1 according to FIG. 2 is e.g. 150 to 200 mm. The wall thicknesses w2 and w3 result from a comparison of scales.

Figure 3:
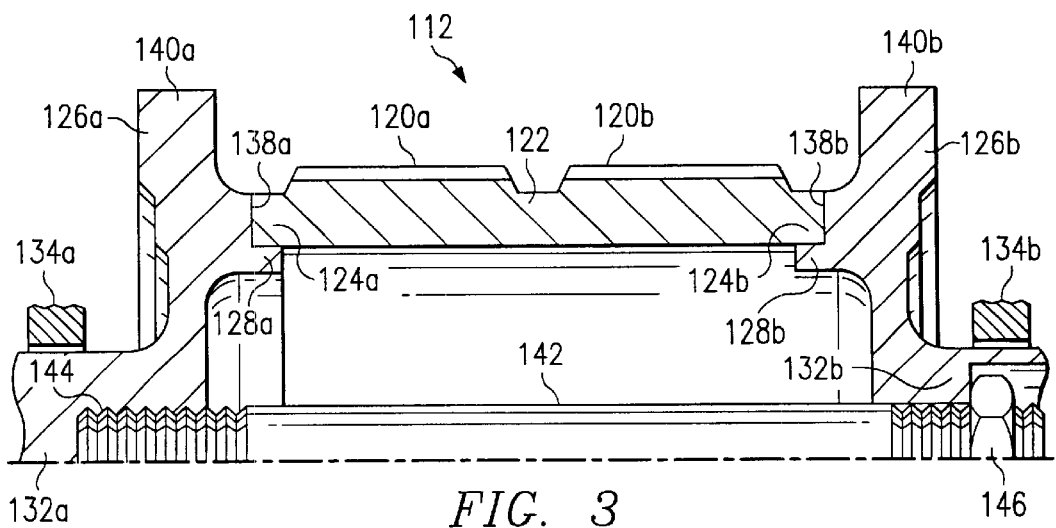
FIG. 3 shows a modification of the embodiment of FIG. 2.

In the embodiment according to FIG. 3, analogous parts are equipped with the same reference numerals as in FIG. 1, increased by the number 100, respectively.

One recognizes that according to FIG. 3 the axial cohesion of the two end plates 126a and 126b is caused by a tension rod 142, which is screwed to the end plate 126a at 144 and which is furthermore screwed to a nut 146 abutting the end plate 126b under tension.

Figure 4:
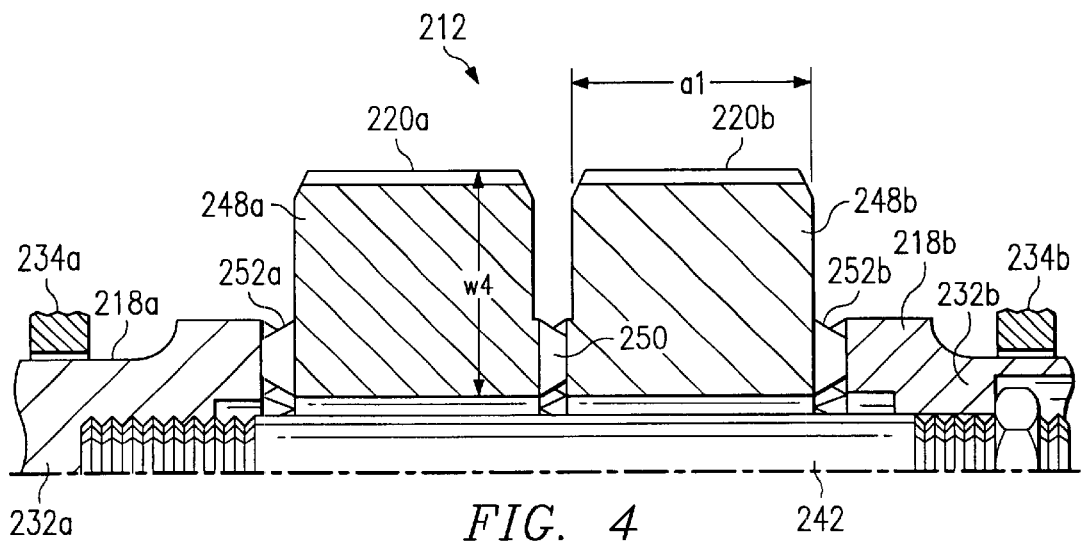
FIG. 4 shows a second embodiment of a toothed wheel according to the invention in a longitudinal section containing the axis.

According to FIG. 4, the toothed wheel unit 212 is formed by two toothing carrier plates 248a and 248b, which are centered with respect to each other by means of serrations 250. Bearing journals 232a and 232b abut the toothing carrier plates 248a and 248b, respectively, by means of serrations 252a and 252b, respectively, the bearing journals being tensioned against each abutting toothing carrier plate 248a and 248b, respectively, by means of a tension rod 242. The radial ring thickness w4 and the axial thickness al can be kept low, e.g. in the order of 350 mm, so that again each volume element of the individual components is situated relatively close to the respective closest surface and is therefore well accessible to heat and other treatments.

Figure 5:
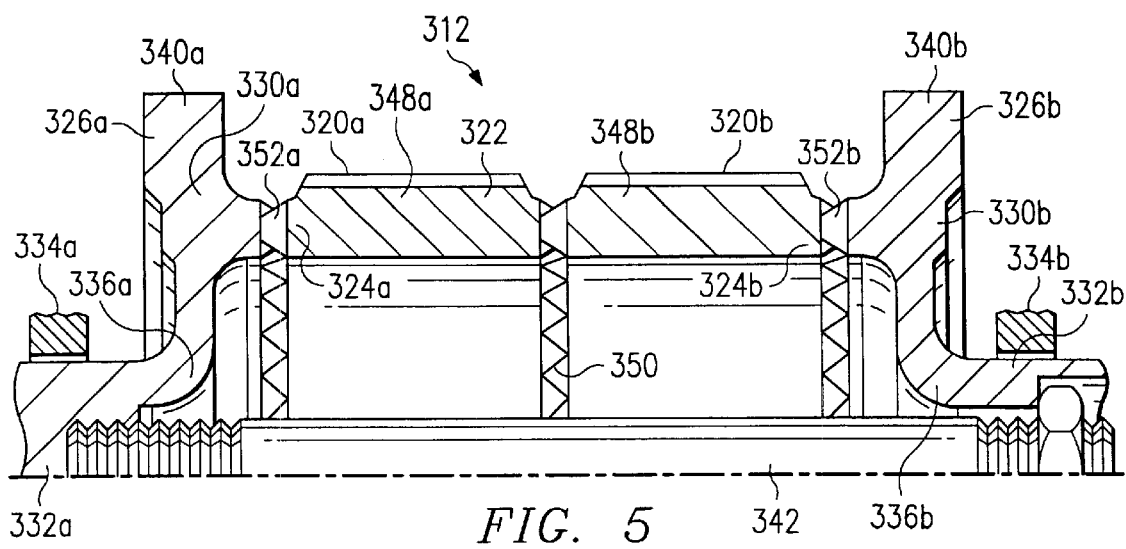
FIG. 5 shows a modification of FIG. 4.

The embodiment according to FIG. 5 represents a combination of the embodiments according to FIG. 3 and FIG. 4. Here one succeeds in limiting the large block of material, namely the toothing carrier casing 322 composed of the ring plates 348a and 348b, to a very small volume so that particularly favourable conditions with respect to the accessibility of each volume element to external treatments exist inside the ring plates 348a, 348b. Parts and forms which are analogous to the embodiments according to FIGS. 3 and 4 are designated by the same reference numerals as there, with the preceding number 3 being added, respectively.

Figure 6:
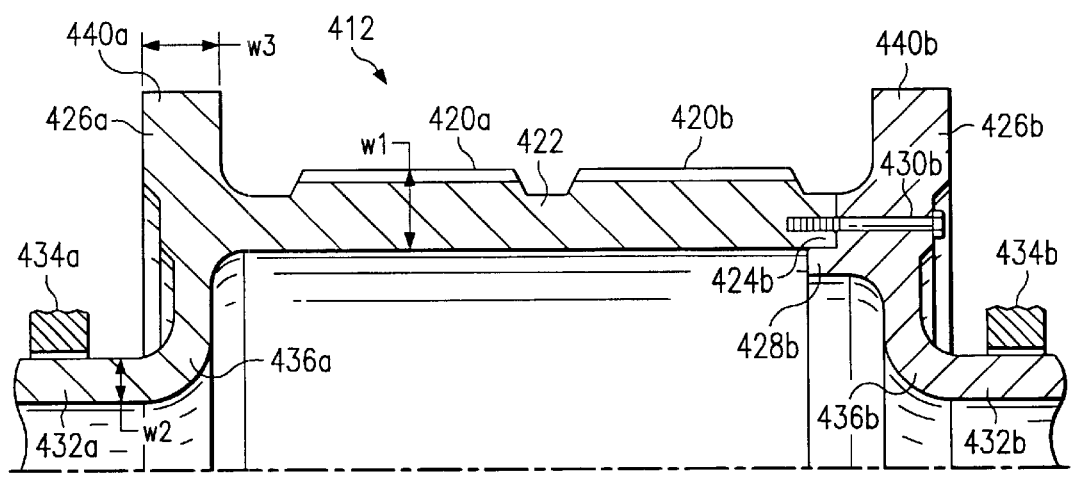
FIG. 6 shows a third embodiment of a toothed wheel unit according to the invention in a longitudinal section containing the axis.

Another alternative of FIG. 2 is represented in FIG. 6. Analogous parts are designated by the same reference numerals with a preceding number 4. In this embodiment the casing 422 is formed integrally with one of the end plates 426a, whereas the other end plate 426b, as in FIG. 2, is connected to the toothing carrier casing 422. One recognizes that even in the case of the integral combination of the toothing carrier casing 422 and the end plate 426a, continuous small wall thicknesses w1, w2, w3 are achieved. The combined wheel body 422, 426a, 432a can be produced in the way described in the introduction of the description.

Figure 7:
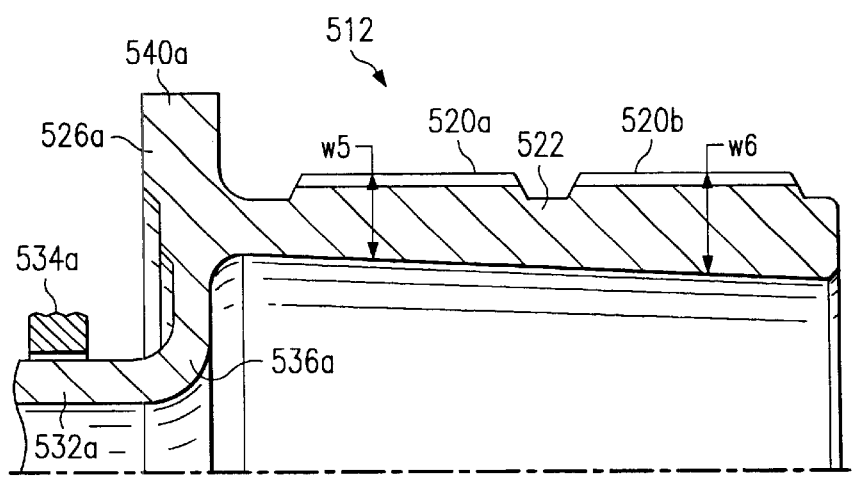
FIG. 7 shows a fourth embodiment of a toothed wheel unit according to the invention in a longitudinal section containing the axis.

In the embodiment according to FIG. 7, a cantilevered toothed wheel unit 512 running in a one-sided bearing 534a is represented, in which the left end plate 526a is produced integrally with the toothing carrier casing 522 and the right end plate is missing. As to the production, the items stated in context with FIG. 6 are valid. Attention is drawn to the fact that the wall thicknesses w5 and w6 are different. The difference in wall thicknesses between w5 and w6 aims at obtaining identical radial expansions in the left and the right end region of the toothing carrier casing 522 under the influence of centrifugal forces.

Figure 8:
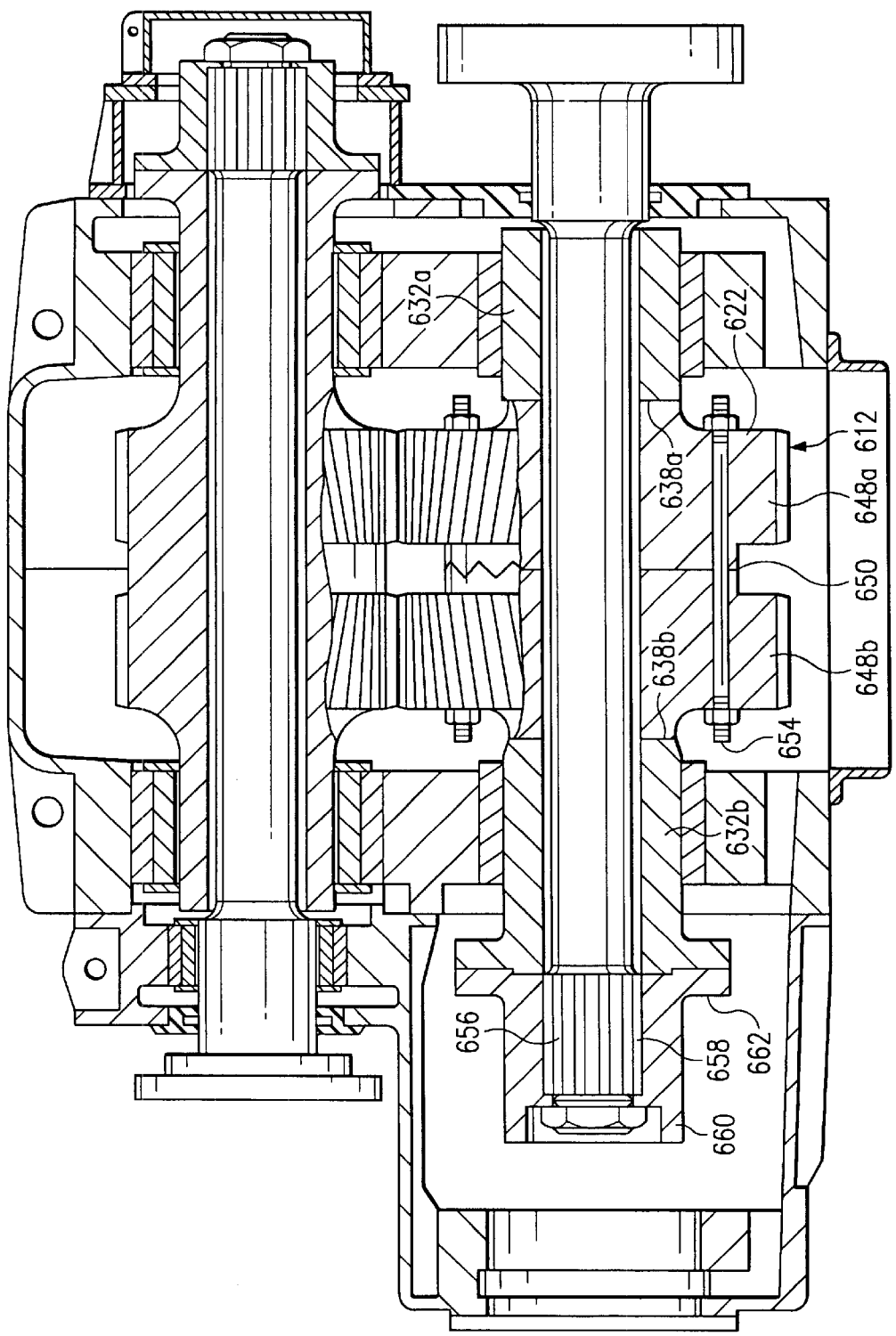
FIG. 8 shows a fifth embodiment of a thoothed wheel unit according to the invention as a part of a spur gear.

According to FIG. 8, two toothing carrier plates 648a and 648b are connected to each other by means of tie bolts 654 and serrations 650 and are connected to the bearing journals 632a and 632b in any way, e. g. by welding at the abutment zones 638a and 638b. One recognizes that the ring shape of the toothing carrier plates 648a and 648b serves to introduce a torsion shaft 656, which is connected to a connection portion 660 in a torque transmitting way, e.g. by means of a toothing 658, the connection portion being flanged on the bearing journal 632b at 662. The toothing 658 can also be replaced by a screwing or a different type of coupling, e.g. a membrane coupling.

Figure 9:
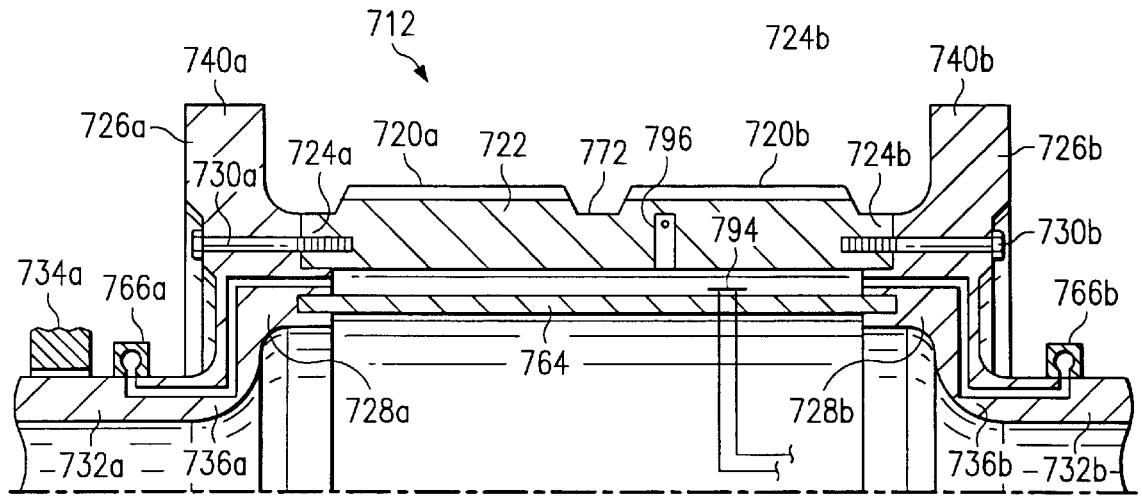
FIG. 9 shows an embodiment corresponding to FIG. 2 with casing cooling.

According to FIG. 9, a cooling casing 764 which serves to guide a coolant is arranged inside the toothing carrier casing 722. The coolant arrives from a first tie-in point 766a on the bearing journal 732a and flows to a second tie-in point 766b on the bearing journal 732b. The flow conditions according to FIG. 9 are represented in detail in FIG. 9a.

Figure 9A:
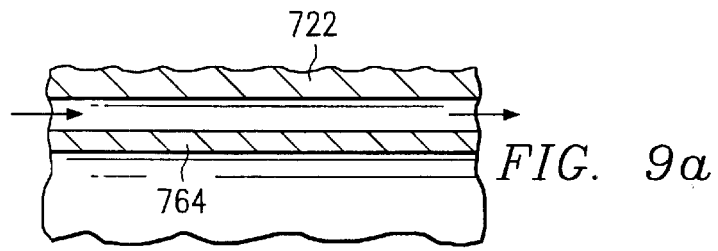
FIGS. 9a–9d show different variants of the casing cooling.
Figure 9B:
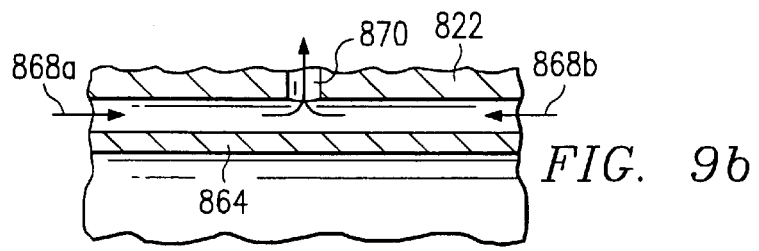

In FIG. 9b the flow conditions are modified inasmuch as the coolant arrives in the direction of the arrows 868a and 868b from both ends of the toothing carrier casing 822 and flows out in the radially central region of the toothing carrier casing through a radial bore 870, which is situated in the region of a turned groove 772 according to FIG. 9. In this case it is suggested to use a lubricant as coolant, simultaneously serving to lubricate the toothings 720a, 720b.

Figure 9C:
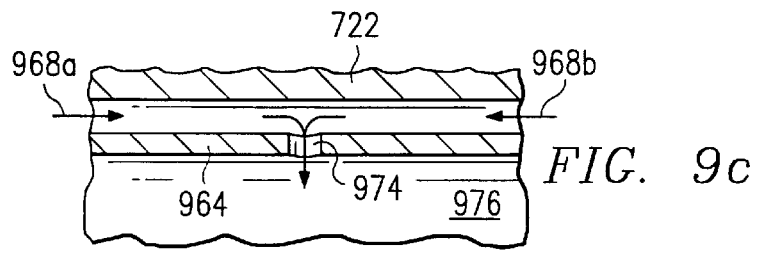

In FIG. 9c the coolant flow is modified inasmuch as the coolant arrives in the direction of the arrows 968a and 968b from tie-in points 766a, 766b corresponding to FIG. 9, and can flow out through a bore 974 of the cooling casing 964 through the central space 976 and through one of the journals 732a, 732b according to FIG. 9.

Figure 9D:
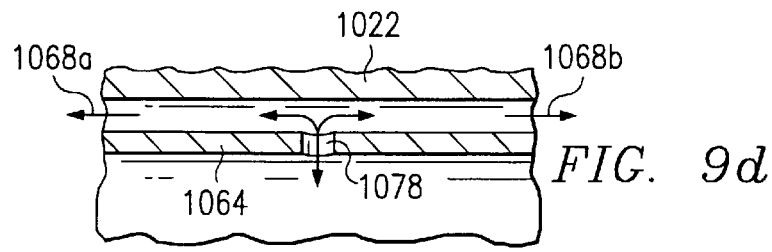

According to FIG. 9d, the coolant flows into the intermediate space between the cooling casing 1064 and the toothing carrier casing 1022 in the direction of the arrow 1078 and flows out in the direction of the arrows 1068a and 1068b, e.g. again through tie-in points 766a, 766b, as is shown in FIG. 9.

Figure 10:
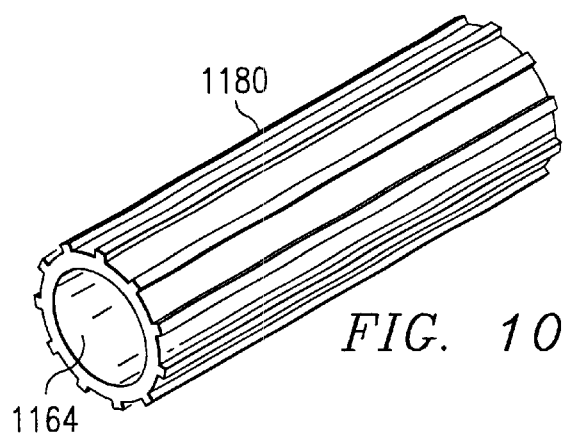
FIGS. 10 and 11 show different cooling casing forms.
Figure 11:
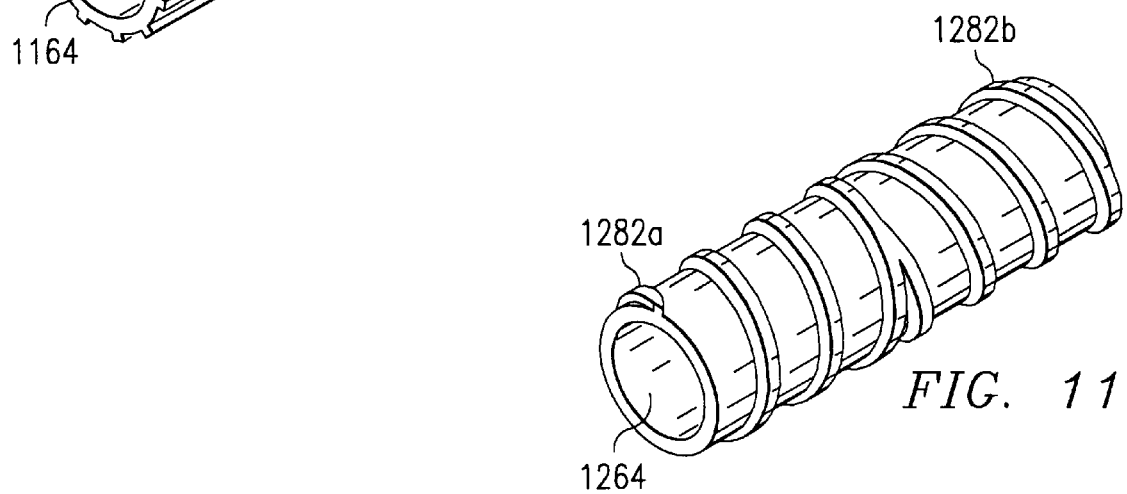

According to FIG. 10, guiding ribs 1180 are arranged on the cooling casing 1164 corresponding to the cooling casing 764 of FIG. 9, the guiding ribs extending in the axial direction and favouring a directed flow with a high flow velocity, approximately corresponding to FIG. 9a. According to FIG. 11, helically extending guiding ribs 1282a and 1282b are arranged on a cooling casing 1264 with an opposite pitch, leading to a flow pattern according to FIGS. 9b, 9c or 9d.

Figure 12:
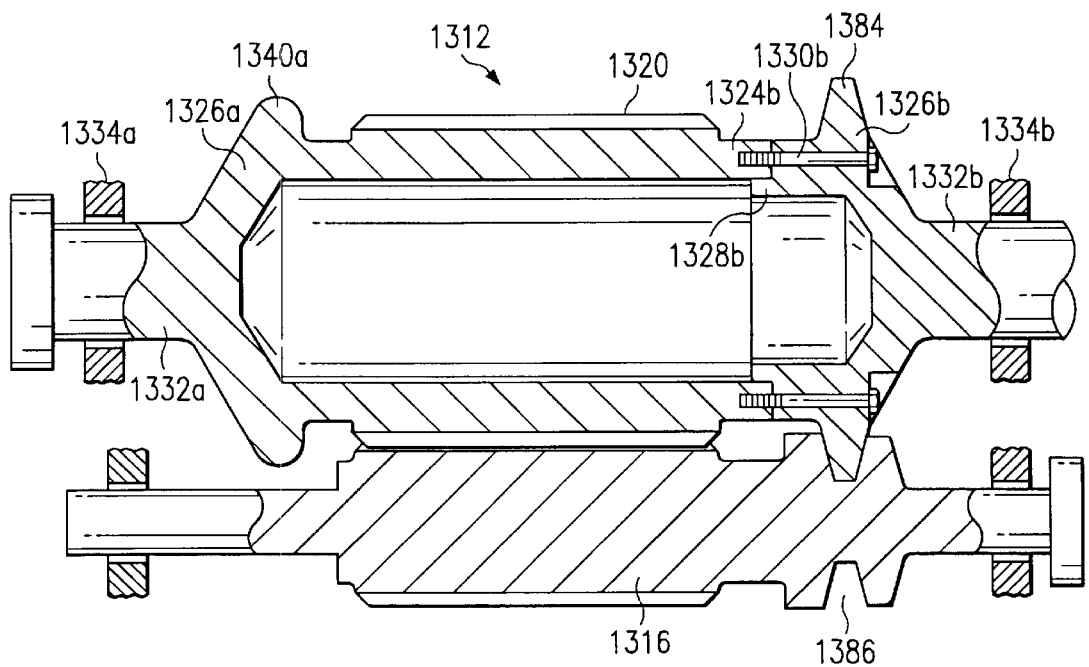
FIG. 12 shows an embodiment similar to the one in FIG. 6 with an annular pressure comb on one end plate.

The embodiment of FIG. 12 essentially corresponds to the embodiment of FIG. 6 In addition to FIG. 6, an annular pressure comb 1384 is mounted on the end plate 1326b, the annular pressure comb being engaged with a ring-shaped pressure comb receiving groove 1386 of a counter-spur wheel 1316 to secure the axial position.

Figure 13:
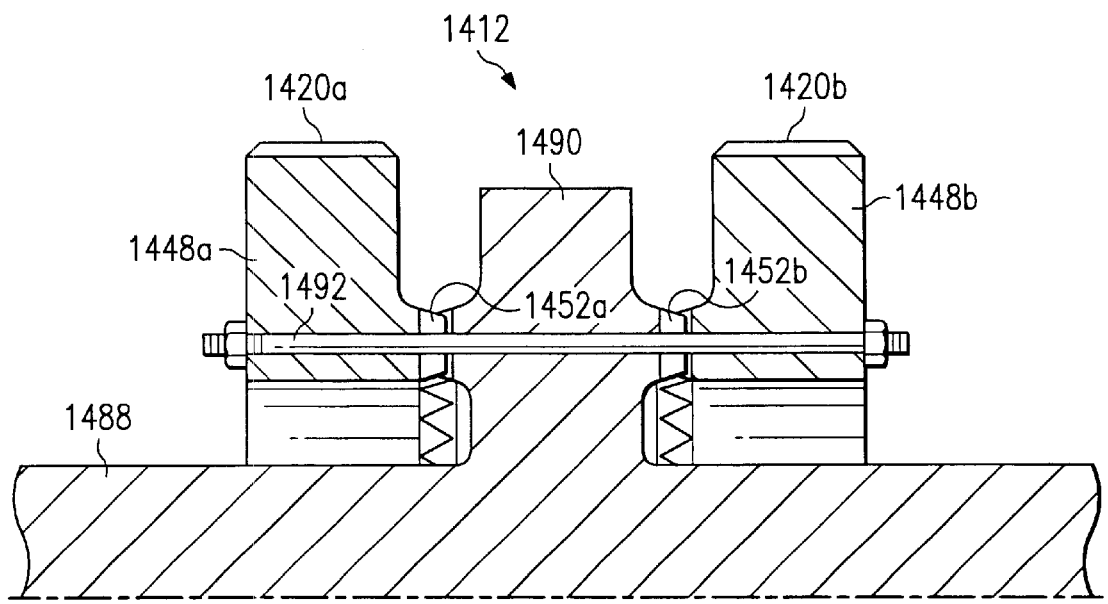
FIG. 13 shows a sixth embodiment of a toothed wheel unit according to the invention in a longitudinal section containing the axis.

According to FIG. 13, a shaft 1488 is provided with a radial flange 1490, to which toothing carrier plates 1448a and 1448b are connected by means of tension rods 1492, using serrations 1452a and 1452b. One can easily recognize that also in this case the wall thicknesses of all components of the toothed wheel unit 1412 are small so that each volume element is accessible to an external heat treatment or other treatment, e.g. a forging treatment, via small distances.

Figure 14:
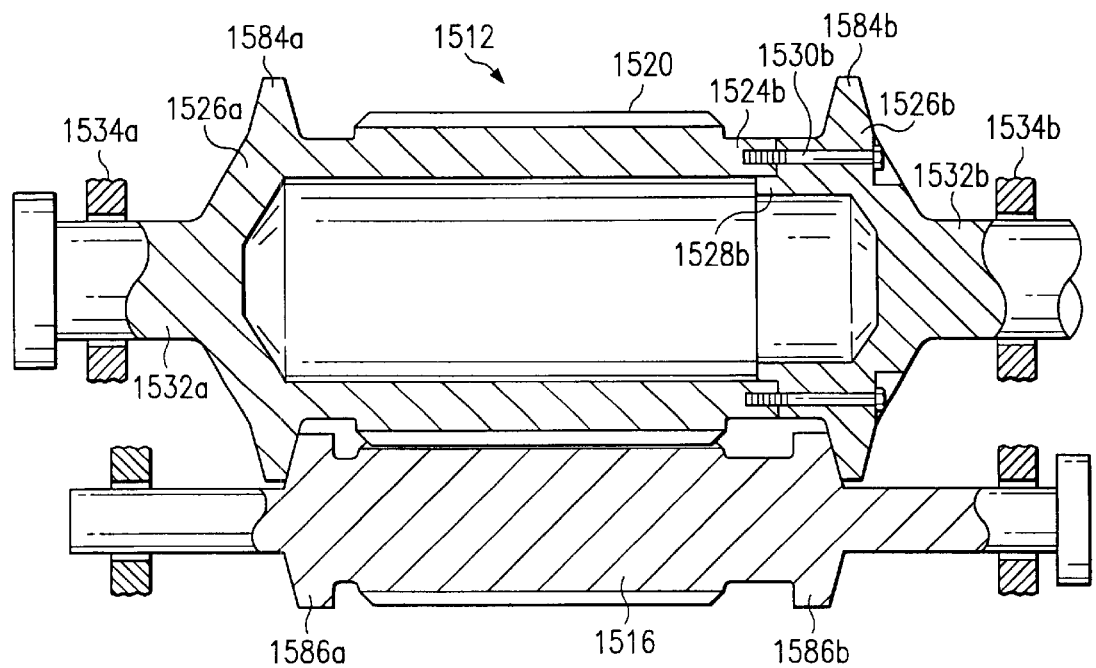
FIG. 14 shows an embodiment similar to the one in FIG. 12 with two annular pressure combs on the toothed wheel unit and the counter-spur wheel, respectively.

FIG. 14 shows another embodiment, which essentially corresponds to the embodiment of FIG. 12. However, instead of the ring-shaped pressure comb receiving groove 1386 of FIG. 12, annular pressure combs 1584a, 1586a and 1584b, 1586b cooperating with each other in pairs are provided on both sides of the toothing 1520 both on the toothed wheel unit 1512 and on the counter-spur wheel 1516. In addition to an engagement securing the axial position, such an arrangement also has the favourable effect of a uniform axial force transmission via both pairs of annular pressure combs 1584a, 1586a and 1584b, 1586b. The moulding of the bearing journals is of course dependent on the question if the respective bearing journal is meant to transmit torque or not.

Instead of the cooling casing, other shapes of coolant conducting surfaces can of course be provided. In the case of the embodiment of FIG. 9 e.g., it would be possible without problems to completely omit the cooling casing 764, which, however, would lead to a large permanent oil volume inside the toothed wheel unit and could possibly lead to unbalanced states. In case of the plate embodiment of FIG. 5, it would also be possible to provide the two ring-shaped toothing carrier plates 348a and 348b with axially joining channel bores.

As it has been emphasized several times before, the coolant course is adapted to the respective temperature profile. In the case of reducing gears with a herringbone toothing (double helical toothing), the temperature development depends on the question, if the arrow of the herringbone points into the rotational direction or into the opposite direction. If the arrow points in the direction opposite to the rotational direction, the highest tooth temperature develops in the middle of the arrow so that the oil has to be fed at this position corresponding to FIG. 9d.

Possible variations of the toothing stiffness along the width of the toothing can be compensated by a toothing correction and/or by a corresponding arrangement and/or by variation of the radial thickness of the toothing carrier casing.

The following has to be remarked as to the embodiment of FIG. 9 in connection with FIG. 9b: In the region of the ring groove 772, the coolant flowing out in the direction of the arrow 877 reaches the toothings 720a and 720b together with additionally injected toothing lubricant oil and flows through these toothings towards the ring extensions 740*a* and 740*b*, if the arrow points into the rotational direction. The lubricant oil reaching the ring extensions 740*a* is received relatively smoothly and is deviated. The collision of the oil with the gear box walls, which is to be expected in the case of missing ring extensions 740*a* and which would lead to a strong spraying, does not occur. Thus the failing back of sprayed oil in the direction of the toothings 720*a* and 720*b* is suppressed, which could lead to a decrease of performance Draining of the oil close to the axis is desirable to avoid rotation and pressure losses.

In FIG. 9 a thermoelement 794 is represented, which can measure the temperature in the coolant flow. This thermoelement could also be arranged in a radial bore 796 to measure the temperature as close to the toothing 720*b* as possible. Of course, several elements can be provided to detect temperature profiles. Signals corresponding to the thermoelement 794 can e.g. be guided through the hollow shaft journal 732 and corresponding transmission devices to a processing and displaying unit.

Usually the toothings are produced on the toothing carrier casing by a metal removing treatment.

The toothed wheel units according to the invention are e.g. used in gears with a power transmission of 50,000 to 100,000 kW.

Gears with toothed wheel units according to the invention are preferably used between a turbine and a generator between a turbine and a compressor between an electric motor and a compressor.

What is claimed is:

1. A toothed wheel unit with external toothing and an axis, comprising a toothing carrier with the external toothing provided on a circumferential surface thereof and further comprising a member selected from a bearing journal and a connection portion, said member being positioned proximate to and extending away from an axial end region of the toothing carrier and being joined to the toothing carrier, and wherein the toothing carrier is provided with one of a tubular toothing carrier casing having an inner diameter (d1) that is larger than the diameter (d2) of said member and a plurality of toothing carrier plates disposed axially with respect to each other and joined with each other directly or indirectly.

2. A toothed wheel unit according to claim 1, wherein the toothing carrier is provided with the tubular toothing carrier casing, an end plate is joined to an end of the tubular carrier casing, and said member is located in a central region of the end plate.

3. A toothed wheel unit according to claim 2, wherein the end plate is unitary with said member.

4. A toothed wheel unit according to claim 2, wherein the end plate, as viewed in a sectional plane containing the axis of the toothed wheel unit, has walls which diverge from a plane normal to the axis in a radial intermediate region between the outer diameter of said member and the inner diameter of the toothing carrier casing.

5. A toothed wheel unit according to claim 4, wherein, as viewed in a sectional plane containing the axis of the toothed wheel unit, the wall shape and the mass distribution of the end plate are such that radial displacements of a connection region on the end plate side and of a connection region on the toothing carrier side due to centrifugal forces are approximated to one another irrespective of the connection of the two connection regions.

6. A toothed wheel unit according to claim 2, wherein, as viewed in a sectional plane containing the axis of the toothed wheel unit, the end plate has a convexly curved portion facing an inner space of the toothing carrier casing in the radial region between the outer diameter of said member an the toothing carrier casing.

7. A toothed wheel unit according to claim 2, wherein the end plate is provided with a compensation mass which radially exceeds a zone of connection between the end plate and the toothing carrier casing.

8. A toothed wheel unit according to claim 2, and further comprising at least one of an annular pressure comb and a pressure comb engagement ring operatively associated with the end plate.

9. A toothed wheel unit according to claim 7, and further comprising at least one of an annular pressure comb and a pressure comb engagement ring operatively associated with the compensation mass.

10. A toothed wheel unit according to claim 2, wherein the end plate is welded to the toothing carrier casing at a zone of connection between the end plate and the toothing carrier casing.

11. A toothed wheel unit according to claim 2, wherein the end plate is in at least one of a torque transmitting and a centering form-fit connection with the toothing carrier casing at a zone of connection between the end plate and the toothing carrier casing.

12. A toothed wheel unit according to claim 2, wherein the end plate is in a force transmitting connection with the toothing carrier casing at a zone of connection between the end plate and the toothing carrier casing.

13. A toothed wheel unit according to claim 2, wherein the end plate is axially tensioned by axial tensioning apparatus towards the toothing carrier casing at the zone of connection.

14. A toothed wheel unit according to claim 13, wherein the axial tensioning apparatus is provided in the radial region of the zone of connection.

15. A toothed wheel unit according to claim 13, wherein the axial tensioning apparatus is provided radially inwardly of the zone of connection.

16. A toothed wheel unit according to claim 13, wherein the axial tensioning apparatus is provided proximate the axis of the toothed wheel unit.

17. A toothed wheel unit according to claim 2, wherein a centering structure is provided on at least one of the end plate and the toothing carrier casing.

18. A toothed wheel unit according to claim 2, wherein there are end plates at both ends of the toothing carrier casing and each end plate has one of said members associated therewith.

19. A toothed wheel unit according to claim 1, wherein said member has a central hole and wherein a shaft associated with the toothed wheel unit is received in the hole and is in torque transmitting connection with the member radially inwardly of the toothing carrier.

20. A toothed wheel unit according to claim 1, wherein the external toothing is one of spur toothing, helical toothing, and double helical toothing.

21. A toothed wheel unit according to claim 1, wherein cooling surfaces are provided in the toothing carrier close to the external toothing, said cooling surfaces being adapted for at least one of heat exchange contact with a coolant and conducting of a coolant.

22. A toothed wheel unit according to claim 2, wherein cooling surfaces are provided in the toothing carrier casing close to the external toothing, said cooling surfaces being adapted for at least one of heat exchange contact with a coolant and conducting of a coolant.

23. A toothed wheel unit according to claim 22, wherein said cooling surfaces include a surface of a cooling casing, which is arranged radially inside the toothing carrier casing.

24. A toothed wheel unit according to claim 22, wherein there are coolant conducting surfaces configured to cause a coolant flow, which is essentially parallel to the axis of the toothed wheel unit.

25. A toothed wheel unit according to claim 22, wherein there are coolant conducting surfaces configured to cause a coolant flow with a helical course relative to the axis of the toothed wheel unit.

26. A toothed wheel unit according to claim 22, wherein the coolant conducting surfaces are configured to cause a coolant flow, which passes at least once continuously along substantially the entire axial length of the toothing carrier casing.

27. A toothed wheel unit according to claim 22, wherein the coolant conducting surfaces are configured to cause coolant flows, which pass from both axial ends of the external toothing to an axially central region of the toothing carrier casing.

28. A toothed wheel unit according to claim 22, wherein the coolant conducting surfaces are configured to cause coolant flows, which pass from an axially central region of the toothing carrier casing to both axial ends of the toothing carrier casing.

29. A toothed wheel unit according to claim 22, wherein the coolant conducting surfaces include at least one opening in an axially central region of the toothing carrier casing for providing coolant flow from within the toothing carrier casing towards a region surrounding the external toothing.

30. A toothed wheel unit according to claim 29, wherein the at least one opening is located in an axially central interruption of the external toothing.

31. A toothed wheel unit according to claim 23, wherein the cooling casing has coolant conducting ribs on its outer surface directed towards the inner circumferential surface of the toothing carrier casing.

32. A toothed wheel unit according to claim 22, wherein coolant conducting ribs are arranged at the inside of the toothing carrier casing.

33. A toothed wheel unit according to claim 31 or claim 32, wherein the ribs extend essentially parallel to the axis of the toothed wheel unit.

34. A toothed wheel unit according to claim 31 or claim 32, wherein the ribs extend helically around the axis of the toothed wheel unit.

35. A toothed wheel unit according to claim 2, wherein the toothing carrier casing is formed by at least one single-piece tube section.

36. A toothed wheel unit according to claim 2, wherein the toothing carrier casing is formed by a plurality of single-piece tube sections coupled to each other by at least one of a centering form-fit connection, a torque transmitting connection, and a tensioning connection.

37. A toothed wheel unit according to claim 35, wherein tube sections having external diameters (toothing diameters) of 900 mm or more have radial thicknesses of less than 200 mm, and wherein the radial thicknesses of tube sections having external diameters (toothing diameters) of less than 900 mm are reduced from 200 mm by an amount proportional to the ratio of the respective external diameter to 900 mm.

38. A toothed wheel unit according to claim 35, wherein tube sections having external diameters (toothing diameters) of 900 mm or more have radial thicknesses of less than 150 mm, and wherein the radial thicknesses of tube sections having external diameters (toothing diameters) of less than 900 mm are reduced from 150 mm by an amount proportional to the ratio of the respective external diameter to 900 mm.

39. A toothed wheel unit according to claim 35, wherein the radial thickness of the tube section is less than 30% of the tube section external diameter (toothing diameter).

40. A toothed wheel unit according to claim 35, wherein the radial thickness (w1) of the tube section less the toothing height is more than four times the real pitch module of the toothing.

41. A toothed wheel unit according to claim 35, wherein the radial thickness of the tube section less the toothing height is more than eight times the real pitch module of the toothing.

42. A toothed wheel unit according to claim 1, wherein the toothing carrier has said plurality of toothing carrier plates and the axial thickness of each of the toothing carrier plates is less than 200 mm.

43. A toothed wheel unit according to claim 42, wherein the axial thickness of each of the toothing carrier plates is less than 150 mm.

44. A toothed wheel unit according to claim 1 or claim 42, wherein the toothing carrier plates are annular.

45. A toothed wheel unit according to claim 1 or claim 42, wherein the external toothing is axially subdivided into individual axial sections of the external toothing, and each axial section is located on a respective toothing carrier plate.

46. A toothed wheel unit according to claim 44, wherein the annular toothing carrier plates are connected with each other by at least one of a centering form-fit connection and a torque transmitting form-fit connection.

47. A toothed wheel unit according to claim 44, where the unit comprises a shaft with a radial flange and wherein a respective annular toothing carrier plate is mounted on each side of the radial flange.

48. A toothed wheel unit according to claim 47, wherein the annular toothing carrier plates are connected with the radial flange by an axial tensioning connector and at least one of a respective torque-transmitting form-fit connection and a centering form-fit connection.

49. A toothed wheel unit according to claim 44, wherein the radial thickness of the annular toothing carrier plates and the axial thickness of the annular toothing carrier plates are less than 300 mm.

50. A toothed wheel unit according to claims 44, wherein the radial thickness of the annular toothing carrier plates and the axial thickness of the annular toothing carrier plates are less than 200 mm.

51. A toothed wheel unit according to claim 1, wherein temperature sensor elements are mounted proximate to the toothing.

52. A toothed wheel unit according to claim 2, wherein temperature sensor elements are mounted at the inner circumferential surface of the toothing carrier casing.

53. A toothed wheel unit according to claim 1, and further comprising at least one of at least one annular pressure comb and at least one pressure comb engagement ring.

54. A toothed wheel unit according to claim 1, wherein the toothed wheel unit is adapted for use for at least one of heavy machinery gears and rapidly moving gears like turbomachinery gears.

55. A toothed wheel unit according to claim 39, wherein the radial thickness of the tube section is less than 20% of the tube section external diameter (toothing diameter).

56. A toothed wheel unit with external toothing and an axis, comprising a toothing carrier and further comprising at least one central member selected from a bearing journal and a connection portion, said central member extending away from at least one axial end region of the toothing carrier and being joined to the toothing carrier, and wherein the toothing carrier is provided with at least one hollow toothing carrier member with external toothing shaped on an external surface thereof, said hollow toothing carrier member being joined to at least one torque transmission member adapted for transmitting at least radial and circumferential forces between said at least one central member and said at least one hollow toothing carrier member, the shape and the mass distribution of the at least one torque transmission member being such that radial displacements of a connection region of the torque transmission member and of a connection region of the at least one hollow toothing carrier member due to operational centrifugal forces are approximated to one another irrespective of said two connection regions being joined together, said at least one torque transmission member being provided with a compensation mass which radially exceeds the connection regions.

57. A toothed wheel unit with external toothing and an axis, comprising a toothing carrier and further comprising at least one central member selected from a bearing journal and a connection portion, said central member extending away from at least one axial end region of the toothing carrier and being joined to the toothing carrier and wherein the toothing carrier is provided with at least one hollow toothing carrier member with external toothing shaped on an external surface thereof, said hollow toothing carrier member being joined to at least one torque transmission member adapted for transmitting at least radial and circumferential forces between said at least one central member and said at least one hollow toothing carrier member, said at least one torque transmission member being provided with a compensation mass which radially exceeds the connection regions.

58. A toothed wheel unit according to any one of claims 1, 56, and 57, wherein at least a part of the toothing carrier is forged from steel capable of being heat treated.

59. A toothed wheel unit according to claim 58, wherein said part of the toothing carrier forged from steel capable of being heat treated is machined by a metal cutting treatment after forging and heat treated thereafter.

60. A toothed wheel unit according to claim 59, wherein said part is fine-machined by metal cutting after heat treatment.

61. A toothed wheel unit as claimed in claim 59, wherein said steel capable of being heat treated is a steel capable of being case hardened and the respective part is case hardened after machining.

62. A toothed wheel unit as claimed in claim 59, wherein the steel capable of being heat treated is one of a nitriding steel and a tempering steel.

63. A toothed wheel unit as claimed in claim 61, wherein said part of the toothing carrier case hardened after machining is a tubular toothing carrier casing.

64. A toothed wheel unit as claimed in claim 61, wherein said part of the toothing carrier case hardened after machining is a toothing carrier plate.

65. A toothed wheel unit as claimed in claim 63, wherein said end plate is made of tempering steel.

\* \* \* \* \*

UNITED STATES PATENT AND TRADEMARK OFFICE
CERTIFICATE OF CORRECTION

PATENT NO. : 6,334,369 B1
DATED : January 1, 2002
INVENTOR(S) : Hans-Georg Sandig It is certified that error appears in the above-identified patent and that said Letters Patent is hereby corrected as shown below:

<u>Title page,</u>
Item [73], Assignee, "BHS Cincinnati" should read -- BHS-Cincinnati --

<u>Column 1,</u>
Line 3, insert -- The present application is a continuation of U.S. Application Serial No. 09/258,107, filed February 25, 1999. --

<u>Column 3,</u>
Line 11, "possibilites" should read -- possibilities --
Line 35, "radial" should read -- radially --
Line 54, "as—viewed" should read -- —as viewed --

<u>Column 4,</u>
Line 12, "according to claim 8," should be deleted
Line 49, "according to claim 15," should be deleted <u>Column 5,</u>
Line 28, "according to claim 20," should be deleted <u>Column 6,</u>
Line 3, "reduceable" should read -- reducible --
Line 7, ", if according to claim 20," should be deleted
Line 56, "according to" should be deleted
Line 57, "claim 38" should be deleted <u>Column 7,</u>
Line 32, "thoothed" should read -- toothed --

<u>Column 11,</u>
Line 57, "radial" should read -- radially --

<u>Column 12,</u>
Line 5, "an" should read -- and --
Line 41, "proximate" should read -- proximate to --

<u>Column 13,</u>
Lines 19 and 24, "flows," should read -- flows --
Line 36, "coolant conducting" should read -- coolant-conducting --

UNITED STATES PATENT AND TRADEMARK OFFICE
CERTIFICATE OF CORRECTION

PATENT NO. : 6,334,369 B1
DATED : January 1, 2002
INVENTOR(S) : Hans-Georg Sandig It is certified that error appears in the above-identified patent and that said Letters Patent is hereby corrected as shown below:

<u>Column 16,</u>
Line 11, "forging" should read -- forging, --
Lines 22 and 26, "case hardened" should read -- case-hardened --

Signed and Sealed this

First Day of April, 2003

JAMES E. ROGAN
*Director of the United States Patent and Trademark Office*